(12) United States Patent
Kim et al.

(10) Patent No.: US 7,431,749 B2
(45) Date of Patent: Oct. 7, 2008

(54) CATALYTIC FILTER FOR REMOVING SOOT PARTICULATES FROM DIESEL ENGINE EXHAUST AND METHOD OF PREPARING THE SAME

(75) Inventors: Yong-Woo Kim, Daejeon (KR); Joon-Seok Min, Daejeon (KR); Sung-Hyoan Kim, Daejeon (KR); Chang-Q Lee, Daejeon (KR); Wha-Sik Min, Daejeon (KR)

(73) Assignee: SK Energy Co., Ltd., Seoul (KR)

( * ) Notice: Subject to any disclaimer, the term of this patent is extended or adjusted under 35 U.S.C. 154(b) by 366 days.

(21) Appl. No.: 10/517,679

(22) PCT Filed: Apr. 14, 2004

(86) PCT No.: PCT/KR2004/000856

§ 371 (c)(1),
(2), (4) Date: May 17, 2005

(87) PCT Pub. No.: WO2004/089508

PCT Pub. Date: Oct. 21, 2004

(65) Prior Publication Data

US 2005/0239642 A1    Oct. 27, 2005

(30) Foreign Application Priority Data

Apr. 14, 2003  (KR) .................. 10-2003-0023515
Feb. 25, 2004  (KR) .................. 10-2004-0012642

(51) Int. Cl.
*B01D 46/00*  (2006.01)
*B01D 53/34*  (2006.01)
*B01D 50/00*  (2006.01)
*F01N 3/022*  (2006.01)

(52) U.S. Cl. .................. 55/523; 55/282.3; 55/385.3; 55/524; 55/DIG. 5; 55/DIG. 10; 55/DIG. 30; 60/297; 60/299; 60/311; 423/213.2; 423/213.5; 423/213.7; 422/180; 427/201

(58) Field of Classification Search ............... 55/282.2, 55/282.3, 385.3, 523, 524, DIG. 5, DIG. 10, 55/DIG. 30; 95/273; 60/274, 295, 297, 299, 60/311; 423/213.2, 213.5, 213.7; 427/180, 427/201, 383.3, 443.2; 422/177, 180

See application file for complete search history.

(56) References Cited

U.S. PATENT DOCUMENTS

| 4,902,487 | A   |   | 2/1990  | Cooper et al. |          |
|-----------|-----|---|---------|---------------|----------|
| 4,973,435 | A   |   | 11/1990 | Jain et al.   |          |
| 5,162,287 | A   | * | 11/1992 | Yoshimoto et al. | 423/215.5 |
| 6,023,930 | A   | * | 2/2000  | Abe et al.    | 60/311   |
| 6,090,746 | A   |   | 7/2000  | Bonnemann et al. |       |
| 6,550,238 | B2  | * | 4/2003  | Andorf et al. | 60/283   |
| 6,622,480 | B2  | * | 9/2003  | Tashiro et al. | 60/295  |
| 6,775,972 | B2  | * | 8/2004  | Twigg et al.  | 60/275   |
| 6,912,847 | B2  | * | 7/2005  | Deeba         | 60/297   |
| 7,210,285 | B2  | * | 5/2007  | Sato et al.   | 60/295   |

FOREIGN PATENT DOCUMENTS

| DE | 44 10 353 A    |   | 9/1994  |
|----|----------------|---|---------|
| DE | 44 10 353 A1   | * | 9/1994  |
| EP | 0 341 832 A    |   | 11/1989 |
| EP | 0 369 163 A1   |   | 5/1990  |
| EP | 1 043 065 A    |   | 10/2000 |
| JP | 1199613        |   | 8/1989  |
| JP | 9052908        |   | 2/1997  |
| JP | 2002119809     |   | 4/2002  |

OTHER PUBLICATIONS

International Search Report from corresponding International Application No. PCT/KR2004/000856, dated Jul. 31, 2004.

* cited by examiner

*Primary Examiner*—Jason M Greene
(74) *Attorney, Agent, or Firm*—Alston & Bird LLP

(57) ABSTRACT

Disclosed is a catalytic filter for removing soot particulates from diesel engine exhaust, which is comprised of monolithic oxidation catalyst upstream of the catalytic filter, which effectively oxidize gaseous pollutants and volatile organic fractions, and a catalyzed wall-flow filter downstream serving to low temperature combustion of soot particulates collected on the filter. Also, the preparation method of the catalytic filter is provided, including the colloidal mixture solution of platinum group metal salts and other metal salts with a water-soluble polymer and a reducing agent, which is then impregnated on a catalyst support, followed by calcining at high temperatures. In the present invention, use of the catalytic filter provides effective means of abating diesel exhaust pollutant emissions, that is, particulate matter (PM) and gaseous pollutants (HC, CO, NOx).

31 Claims, 4 Drawing Sheets

CATALYTIC FILTER FOR REMOVING SOOT PARTICULATES FROM DIESEL ENGINE EXHAUST AND METHOD OF PREPARING THE SAME

TECHNICAL FIELD

The present invention relates to catalytic wall-flow filters for removal of soot particulates from diesel engine exhaust, and preparation methods thereof. More specifically, the present invention relates to a catalytic filter system, capable of continuously burning soot trapped on the filter, thereby regenerating the filter while reducing harmful exhaust gases of carbon monoxide (CO), nitrogen oxides ($NO_x$) and unburned hydrocarbons (HC) therein, as well, and a method of preparing the catalytic filter.

BACKGROUND ART

Generally, particulate matters in diesel engine exhaust are composed of carbonaceous soot particulates with average diameter of 0.3 μm, comprising soots, sulfates and heavy hydrocarbons, which are derived from lubricating oil and unburned fuel. Especially, soot particulates, caused by incomplete combustion of diesel fuel, increase visual discomfort and the degree of air pollution that causes offensive odors, and as well, can damage human health. Therefore, emission control standards for soot particulates in diesel engine exhaust have been further strengthened, but practically applicable technologies satisfying the current emission control standards have not been presently commercially developed. Thus, it is urgently required to develop novel technologies for abatement of the generation of soot particulates and after-treatment of the soot particulates. At present, there are proposed methods of reducing emissions of soot particulates by improvement of engine control technologies or by use of a fuel additive, and methods of removing soot particulates from exhaust gas through a post-treatment device, such as a diesel particulate filter.

As for the method of reducing emissions of the soot particulates, desirable results cannot be obtained by the improvement of engine technology alone for some vehicles. Meanwhile, the use of fuel additives is not cost-effective and may cause secondary pollution by emission thereof into the atmosphere.

The method using post-treatment device includes a trapping process of soot particulates in the exhaust gas by use of a filter medium, and a combustion process of the trapped soot particulates to regenerate inherent filtering performance of the filter medium. However, use of the post-treatment device suffers from excessive increase of back- pressure due to the accumulation of the trapped soots when the trapped soots are not continuously regenerated, resulting in worsening engine performance.

Hence, a number of different options for controlling particulates are diversely attempted, and are largely classified into active regeneration and passive catalytic regeneration.

The active regeneration is used to forcibly combust the soot particulates to regenerate the filter by use of a burner or an electric heater, which is advantageous in terms of superior regeneration performance. However, the above process is disadvantageous in that excessive thermal shock applied to the filter medium leads to the damage of filter medium, while negating economic benefits due to the use of complicated control units.

Additionally, the regeneration process of the filter medium by adding an organic metal additive to diesel fuel is disadvantageous in that the added metal component is deposited in the engine, and fine metallic additive particles not trapped in the filter medium is discharged to the atmosphere, thus causing secondary pollution.

Regarding the passive catalytic regeneration, U.S. Pat. No. 4,902,487 (corresponding to Japanese Patent No. 3,012,249) discloses a catalytic, two-stage, passive particulate filter system including a monolithic oxidation catalyst (upstream) and a ceramic wall-flow diesel filter (downstream). The monolithic oxidation catalyst allows to convert a portion of nitrogen monoxide (NO) contained in diesel exhaust gases into nitrogen dioxide ($NO_2$), which is a much stronger oxidizing agent than oxygen. As such, $NO_2$ has a concentration range of 100-2,000 ppm, and reacts with the soot particulates trapped on the particulate filter downstream, and thus, allows the sooty particulates to be combusted at 225-300° C., thereby purifying the diesel engine exhaust gases. However, since the oxidation catalyst upstream acts also to facilitate generation of sulfate by oxidation of sulfur dioxide ($SO_2$) in the exhaust gas, the use of ultra low sulfur diesel (ULSD) fuel is required. In addition, $NO_2$ formation rate rapidly decreases at higher temperatures due to the constraint of thermodynamic equilibrium. Therefore, it is required to develop a catalytic particulate filter that has a sufficiently low balance point temperature (BPT) to continuously remove soot particulates at the typical exhaust temperature range.

DISCLOSURE OF THE INVENTION

Leading to the present invention, the intensive and thorough research on catalytic filters for removal of soot particulates from diesel engine exhaust, carried out by the present inventors aiming to avoid the problems encountered in the related art, resulted in that a colloidal solution of a platinum group metal (PGM) salt and a metal salt impregnated on a catalyst support is used, instead of conventional aqueous metal salt solutions, thus obtaining a monolithic oxidation catalyst upstream of the catalytic filter, which effectively oxidize volatile organic fractions, and a catalyzed wall-flow filter downstream thereof serving to low temperature combustion of soot particulates collected on the filter, thereby removing soot particulates in exhaust gas.

Accordingly, an object of the present invention is to provide a catalyzed filter for use in decreasing balance point temperatures (BPT) and continuously removing soot particulates in diesel engine exhaust gases, and a method of preparing the same.

Another object of the present invention is to provide a catalyzed filter for reducing gaseous pollutants such as carbon monoxide ("CO"), unburned hydrocarbons ("HC"), and nitrogen oxides ("$NO_x$") in diesel engine exhaust, and a method of preparing the same.

To accomplish the above objects, the present invention provides a method of preparing an oxidation catalyst for oxidizing volatile organic fraction and a catalyzed wall-flow filter for use in removing soot particulates from diesel engine exhaust, including preparing a PGM salt and a transition/alkali metal salt with a water-soluble polymer compound and a reducing agent, to obtain a first colloidal solution, which is then washcoated to a catalyst-support-coated monolithic ceramic substrate, followed by calcination process at high temperatures, to obtain an oxidation catalyst; and treating a PGM salt and a metal salt mixture including at least one selected from a first group of catalyst metal to increase oxidation activity for nitrogen monoxide (NO) and at least one selected from a second group of catalyst metal to decrease a combustion temperature of soot particulates by oxidizing agents, such as nitrogen dioxide and oxygen, with a water-soluble polymer compound and a reducing agent, to obtain a second colloidal solution, which is then washcoated on a catalyst-support-coated wall-flow filter, followed by calcination process at high temperatures, to obtain a catalyzed wall-flow filter.

In such cases, the metal salt mixture for a catalyzed wall-flow filter additionally includes at least one selected from a third group of catalyst metal to prevent oxidation of sulfur dioxide.

BRIEF DESCRIPTION OF THE DRAWING

The above and other objects, features and other advantages of the present invention will be more clearly understood from the following detailed description taken in conjunction with the accompanying drawings, in which.

BEST MODE FOR CARRYING OUT THE INVENTION

Figure 1A:
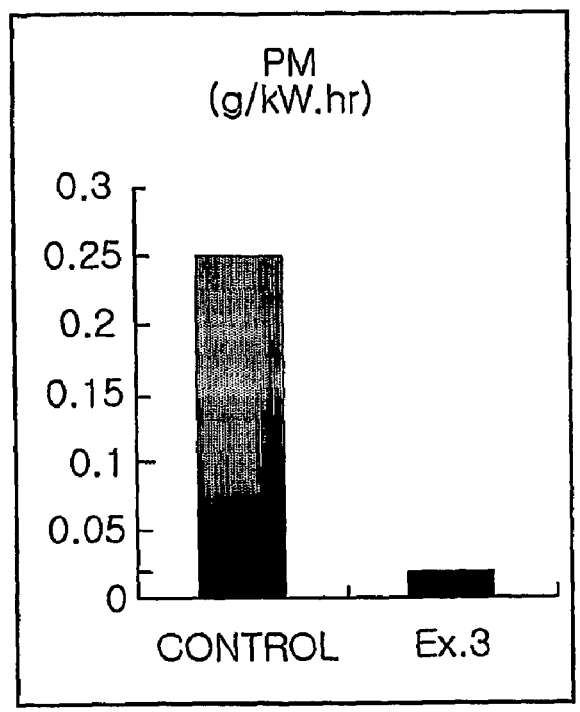
FIGS. 1a to 1d are graphs showing a reduction of soot particulates (PM), nitrogen oxides ($NO_x$), carbon monoxide (CO) and unburned hydrocarbons (THC) in diesel engine exhaust after mounting the catalytic filter of the present invention, comparing with the case without the catalytic filter of the present invention.
Figure 1B:
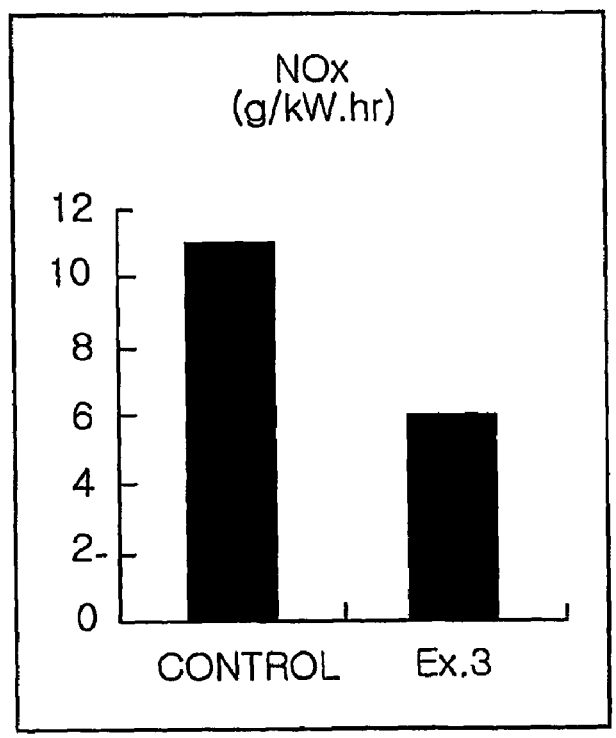
Figure 1C:
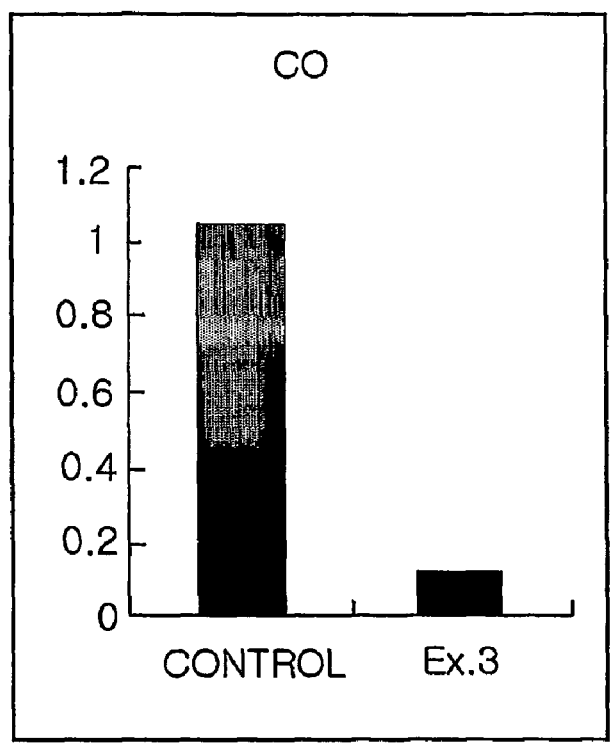
Figure 1D:
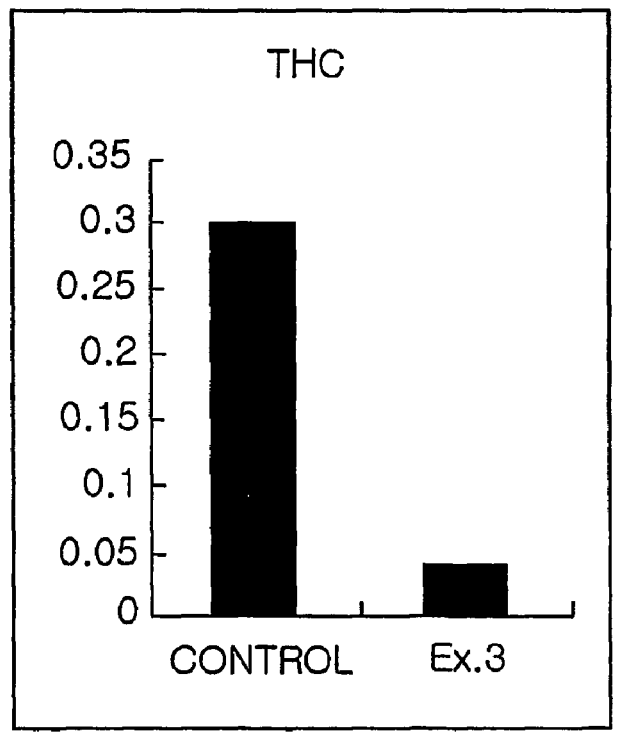

Hereinafter, a detailed description will be given of the present invention with reference to the appended drawings.

Based on the present invention, a catalytic filter for removing soot particulates from diesel engine exhaust is provided, comprised of monolithic oxidation catalyst upstream of the catalytic filter, which effectively oxidize gaseous pollutants and volatile organic fractions and a catalyzed wall-flow filter downstream serving to low temperature combustion of soot particulates collected on the filter. In addition, a preparation method of such a catalytic filter is provided.

The catalytic filter of the present invention can function to continuously regenerate the soot particulates collected on the filter during diesel engine operation and the purified gas is then discharged to the atmosphere.

Such a catalytic filter, for use in removing the soot particulates from the diesel engine exhaust, is prepared by treating a platinum group metal (PGM) salt and a transition/alkali metal salt with a water-soluble polymer compound and a reducing agent, to obtain a first colloidal solution, which is then washcoated to a catalyst-support-coated monolithic ceramic substrate, and followed by calcination process at high temperatures to form an oxidation catalyst; and treating a PGM salt and a metal salt mixture including at least one selected from a first group of catalyst metal to increase oxidation activity for nitrogen monoxide (NO) and at least one selected from a second group of catalyst metal to decrease a combustion temperature of soot particulates by nitrogen dioxide ($NO_2$) and oxygen ($O_2$) with a water-soluble polymer compound and a reducing agent, to obtain a second colloidal solution, which is then washcoated on a catalyst-support-coated wall-flow filter, followed by calcination process at high temperatures, to form a catalyzed wall-flow filter.

Specifically, a conventional support or heat-resistant filter medium, for example, flow-through ceramic monolith, is supported with a catalyst material having high oxidation activity to oxidize gaseous emissions and soluble organic fraction in the exhaust gas.

Moreover, the catalyst mounted upstream reacts with the diesel engine exhaust to induce favorable condition for burning the soot particles collected on the filter downstream. As such, the catalyst mounted upstream is referred to as 'oxidation catalyst'.

As for the oxidation catalyst, a catalyst composition is formulated to maintain high oxidation activity for carbon monoxide (CO) and unburned hydrocarbons (HC) in the diesel engine exhaust, and to oppress the oxidation of sulfur dioxide ($SO_2$) in the exhaust stream, resulting in inducing an atmosphere favorable to combustion of the soot particulates collected on the wall-flow filter downstream.

Concerning the substrate of the oxidation catalyst,—the flow-through substrate is washcoated with the high surface area oxide support to uniformly disperse the active metal components, and then supported with the colloidal solution of the PGM salt and the transition/alkali metal salt.

The high surface area oxide support is exemplified by alumina, silica, and/or titania, which preferably contains 0.1-1.5 g/in$^3$ of $TiO_2$ and 0.1-1.5 g/in$^3$ of $SiO_2$, with a weight ratio of $TiO_2$ to $SiO_2$ of 2-4:1, to have an optimal catalyst support properties. If the weight ratio of $TiO_2$ to $SiO_2$ is less than 2:1, the surface area for uniformly supporting the catalyst material becomes small. Meanwhile, if the weight ratio exceeds 4:1, coatability of the suspension solution to the filter drastically decreases.

The PGM salt includes Pt, Pd, Ru, Ir, Rh, or combinations thereof, and the transition/alkali metal salts have Ba, Ce, Co, Cr, Cs, Cu, Fe, K, Mg, Mn, Mo, Ni, Pb, V, W, or combinations thereof. As such, the weight ratio of the PGM to the transition/alkali metal is preferably in the range of 1:0.1-5. When the weight ratio is less than 1:0.1, sulfate is generated in a large amount by the oxidation of sulfur dioxide in the exhaust gas. Whereas, when the weight ratio exceeds 1:5, the oxidation activity for gaseous and volatile pollutants decreases.

The platinum group metal is used in the amount of 5-45 g/ft$^3$. The amount less than 5 g/ft$^3$ results in low oxidation activity for gaseous pollutants (CO, HC, and NO) whereas the amount exceeding 45 g/ft$^3$ leads to excessive use of expensive precious metal, thus negating economic benefits.

Examples of a starting material of palladium (Pd) include palladium nitrate, palladium chloride, tetraminepalladium dichloride, etc. Also, examples of a starting material of platinum (Pt) include chloroplatinic acid, diaminedinitritoplatinum, diaminetetrachloroplatinum, etc. A starting material of rhodium (Rh) is exemplified by rhodium chloride, rhodium nitrate, triaminerhodium hexachloride, etc.

The colloidal solution for the oxidation catalyst is prepared from treatment of the PGM salt and the transition/alkali metal salt with a water-soluble polymer compound and a reducing agent by colloidal reduction method. Conventionally, a PGM salt is supported to a high-surface area oxide support and then calcined for activation thereof. At this time, however, nano-size precious metal particles are agglomerated upon reduction to a precious metal, thus worsening metal dispersion. Whereas, in the present invention, the precious metal salt in the state of protective copolymer colloidal solution is reduced to precious metal, which is then supported to a high-surface area oxide support and calcined, thereby solving the above problems.

The water-soluble protective copolymer compound is exemplified by polyvinylalcohol, polyvinylpyrrolidone, polymethylacrylate, etc. Examples of the reducing agent include methanol, ethanol, hydrazine, or a mixture of methanol/sodium hydroxide.

The thus obtained colloidal solution is properly controlled in concentration by use of water or alcohol as a diluent.

The above mentioned catalyst is then calcined at high temperatures, for example, 500-600° C., to obtain the oxidation catalyst.

Further, catalyst materials are supported to the filter medium downstream to decrease the combustion temperature of the collected soot particulates. Like this, the catalyst mounted downstream is referred to as 'catalyzed wall-flow filter'.

The soot particulates collected on the catalyzed wall-flow filter are converted to harmless gases by the catalytic combustion reaction with oxygen in the exhaust gas and $NO_2$, which is produced from oxidation of NO through flowing the catalyzed-wall, and then, discharged to the atmosphere.

As in the preparation of the oxidation catalyst, the catalyst composition of the catalyzed wall-flow filter is obtained by supporting the second colloidal solution of the PGM salt and the metal salt mixture to the catalyst-support-coated wall-flow filter.

As such, the PGM salt used for the catalyzed wall-flow filter equals to that used for the preparation of the oxidation catalyst.

The metal salt mixture includes at least one selected from the first group of catalyst metal to increase the catalytic combustion activity for the collected soot particulates, and at least one selected from the second group of catalyst metal to lower the combustion temperature of the soot particulates.

Preferably, the first group of catalyst metal is selected from Ba, Cr, Mn, Fe, Co, Ni, Cu, Mo, V and Pb, and the second group of catalyst metal is selected from Li, Na, K, Mg, Ca and Cs. In such cases, the catalyzed filter contains 5-45 $g/ft^3$ of the PGM, 10-120 $g/ft^3$ of the first group of catalyst metal, and 5-40 $g/ft^3$ of the second group of catalyst metal.

The above metal salt mixture further includes at least one selected from a third group of catalyst metal to prevent oxidation of sulfur dioxide.

The third group of catalyst metal is selected from among V, W and Mo, and is used in the amount of 10-150 $g/ft^3$.

Hence, the second colloidal solution of the catalyzed wall-flow filter is prepared by treating the PGM salt and the metal salt mixture with the water-soluble polymer compound and the reducing agent in colloidal reduction method, as in the preparation of the oxidation catalyst. The above mentioned catalyst is then calcined at high temperatures, for example, 500-600° C., to obtain the catalyzed wall-flow filter.

The support used for the oxidation catalyst is exemplified by flow-through ceramic honeycomb monolith.

Also, the support or filter used for the catalyzed wall-flow filter includes wall-flow ceramic honeycomb filter, ceramic foam, ceramic fiber filter, metal honeycomb, metal foam, metal mesh, etc. In particular, wall-flow ceramic honeycomb filter is preferable.

In the present invention, more easily combustible materials including carbon monoxide, unburned hydrocarbons and soluble organic fraction of particulate matters from the diesel engine exhaust, than the soot particulates, are combusted by the oxidation catalyst prepared from the colloidal solution of the PGM salt and the transition/alkali metal salt. Thereby, the temperature of the exhaust gas arriving at the catalyzed wall-flow filter downstream increases, thus realizing efficient oxidation of the soot collected on the filter.

Moreover, the oxidation catalyst composition containing the PGM metal salt colloid further has other metal salt colloids of magnesium or cobalt, thereby improving the activity of the PGM. For instance, magnesium oxide acts to increase the activity of the PGM so as to effectively combust the soot particulates collected on the filter.

Use of such an oxidation catalyst leads to efficient conversion of carbon monoxide, unburned hydrocarbons, and volatile organic fractions while inducing a favorable conditions for combustion of the soot particulates on the catalyzed filter downstream.

The combustion of the soot particulates trapped in the catalyzed wall-flow filter is facilitated with the aid of a strong oxidizing agent, such as, nitrogen dioxide, the catalytic components of at least one PGM and alkali metal, etc. supported to the filter, as well as the activated oxygen. Carbon dioxide, a completely oxidized product of the soot particulates, is discharged to the atmosphere.

On the other hand, alkali metal component of the catalyzed wall-flow filter composition, such as potassium, acts to enhance the surface activity of the precious metal catalyst bringing the catalyst into tight-contact with the particulates while improving dispersion and reducibility of the metal catalyst.

Furthermore, with the use of the catalytic filter containing the oxidation catalyst and the catalyzed wall-flow filter of the present invention, the temperature required to initiate the combustion of the soot particulates collected on the catalyzed wall-flow filter upon diesel engine operation decreases. In addition, BPT (Balance Point Temperature), the temperature at which the rates of soot accumulation and soot combustion are balanced to each other, decreases to 300-320° C., that is a sufficiently low temperature to continuously remove soot particulates at the typical exhaust temperature from diesel engines, and therefore, the catalytic filter of the present invention can be continuously regenerated without an additional active regeneration device.

Engine dynamometer tests were carried out for the catalytic filter mounting the oxidation catalyst and the catalyzed wall-flow filter of the present invention, and the test results showed the reduction of 92% or more of the soot particulates, 85% or more of CO and HC, and ca. 19% of $NO_x$.

A better understanding of the present invention may be obtained through the following examples which are set forth to illustrate, but are not to be construed as the limit of the present invention.

EXAMPLE 1

(1) Preparation of Colloidal Metal Salt Solution
Platinic Colloidal Solution

In a 2 L flask, 252 g of polyvinylpyrrolidone (average molecular weight: 10,000, Aldrich Chemical) was dissolved in 1 L of deionized water to make a uniform solution, which was then added with 30.4 g of chloroplatinic acid and 1 L of methanol with vigorous stirring. The solution was refluxed at 80° C. for 6 hours, and filtered to obtain 2,070 g of a dark brown platinic colloidal solution containing 0.62 wt % of platinum.

Preparation of Aqueous Metal Salt Solution 15.4 g of ammonium molybdate, 40 g of magnesium nitrate, and 10 g of potassium hydroxide were added to 250 mL of deionized water with vigorous stirring, to prepare aqueous solutions of molybdenum, magnesium, and potassium.

Preparation of Colloidal Solution Mixture

The above platinic colloidal solution was mixed with the aqueous magnesium solution at a weight ratio of 1:1, to make a colloidal metal salt solution for oxidation catalyst. Further, the platinic colloidal solution, the aqueous molybdenum solution, and the aqueous potassium solution were mixed at the same weight ratio, to obtain a colloidal metal salt solution for catalyzed wall-flow filter.

(2) Preparation of Catalytic Filter

A flow-through ceramic monolith having a diameter of 5.66 inch, a length of 3 inch and a cell density of 400 cpsi was used as a substrate of the oxidation catalyst and a wall-flow ceramic filter having a diameter of 5.66 inch, a length of 6 inch and a cell density of 100 cpsi was used as a substrate of the catalyzed wall-flow filter. To the ceramic monolith, ca. 30 wt % of titania and silica slurry solution was washcoated, followed by drying and calcination. Further, to the wall-flow ceramic filter, 7 wt % of titania and silica slurry solution was washcoated, followed by drying and calcination. The colloidal PGM solutions for oxidation catalyst and catalyzed wall-flow filter were washcoated to the supports, respectively, and then dried at 120° C. for 3 hours, and calcined at 500-600° C. for 4-6 hours, to prepare the catalytic filters.

EXAMPLE 2

A catalytic wall-flow filter for removal of soot from diesel engine exhaust was prepared in the same manner as in Example 1, with the exception that flow-through ceramic monolith having a diameter of 10.5 inch, a length of 3 inch and a cell density of 400 cpsi, and wall-flow ceramic filter (Corning Inc.) having a diameter of 10.5 inch, a length of 12 inch and a cell density of 200 cpsi, were used as substrates for the oxidation catalyst and the catalyzed wall-flow filter.

EXAMPLE 3

The catalytic filter prepared in Example 2 mounted to an exhaust pipe of Hyundai Aerocity Bus 540 having an exhaust air volume of 11,149 cc, and subjected to field test in D-13 mode. Subsequently, the reduction of soot particulates in exhaust gas was measured. The results are depicted in FIGS. 1a to 1d.

As is shown in FIGS. 1a to 1d, the catalytic filter of the present invention reduced 92% or more of soot particulates (PM), 85% of CO and HC, and 19% of $NO_x$.

EXAMPLE 4

The catalytic filter of Example 2 was mounted to a diesel engine, and the change of BPT with respect to RPM and torque was measured. The results are given in FIG. 2.

Figure 2:
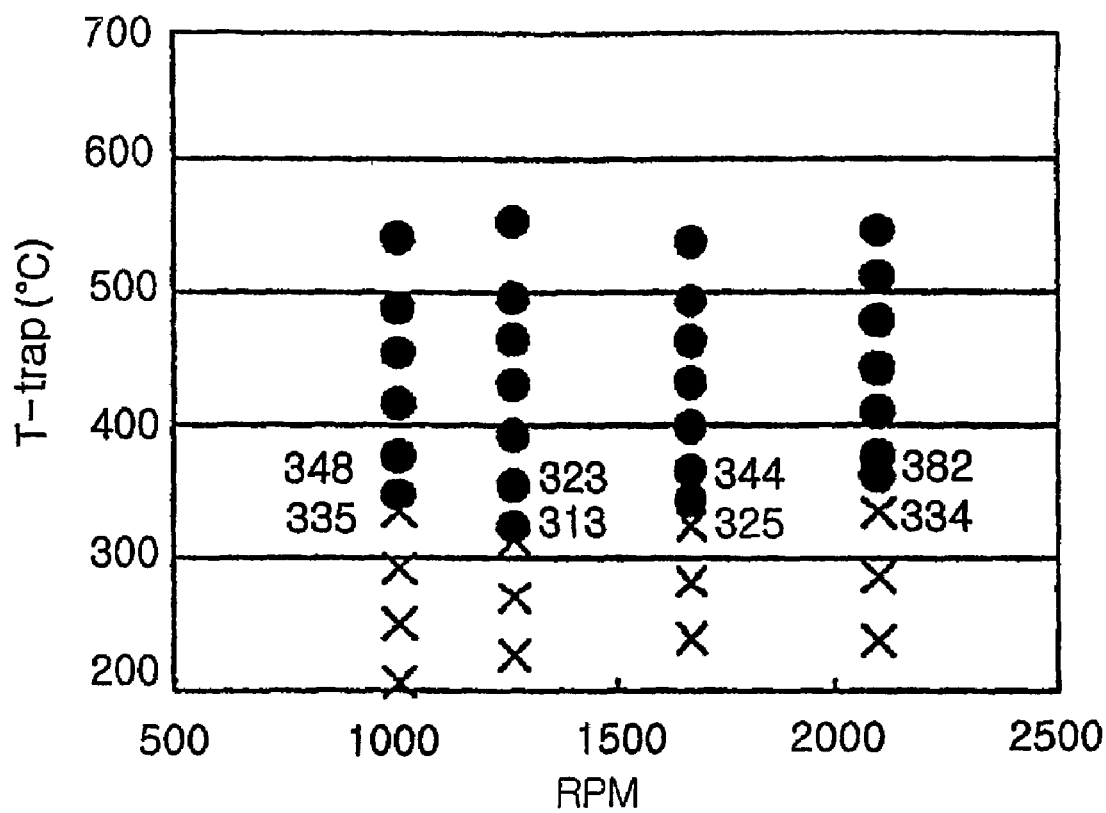
FIG. 2 is a graph representing balance point temperature (BPT) of the catalytic filter of the present invention.

As is shown in FIG. 2, the catalytic filter of the present invention showed a BPT of 300-320° C.

EXAMPLE 5

The catalytic filter of Example 2 was mounted to an urban bus driving in Seoul, Korea, and the backpressure of DPF, which indicates the amount of soot particulates collected in the filter, was monitored daily.

Figure 3:
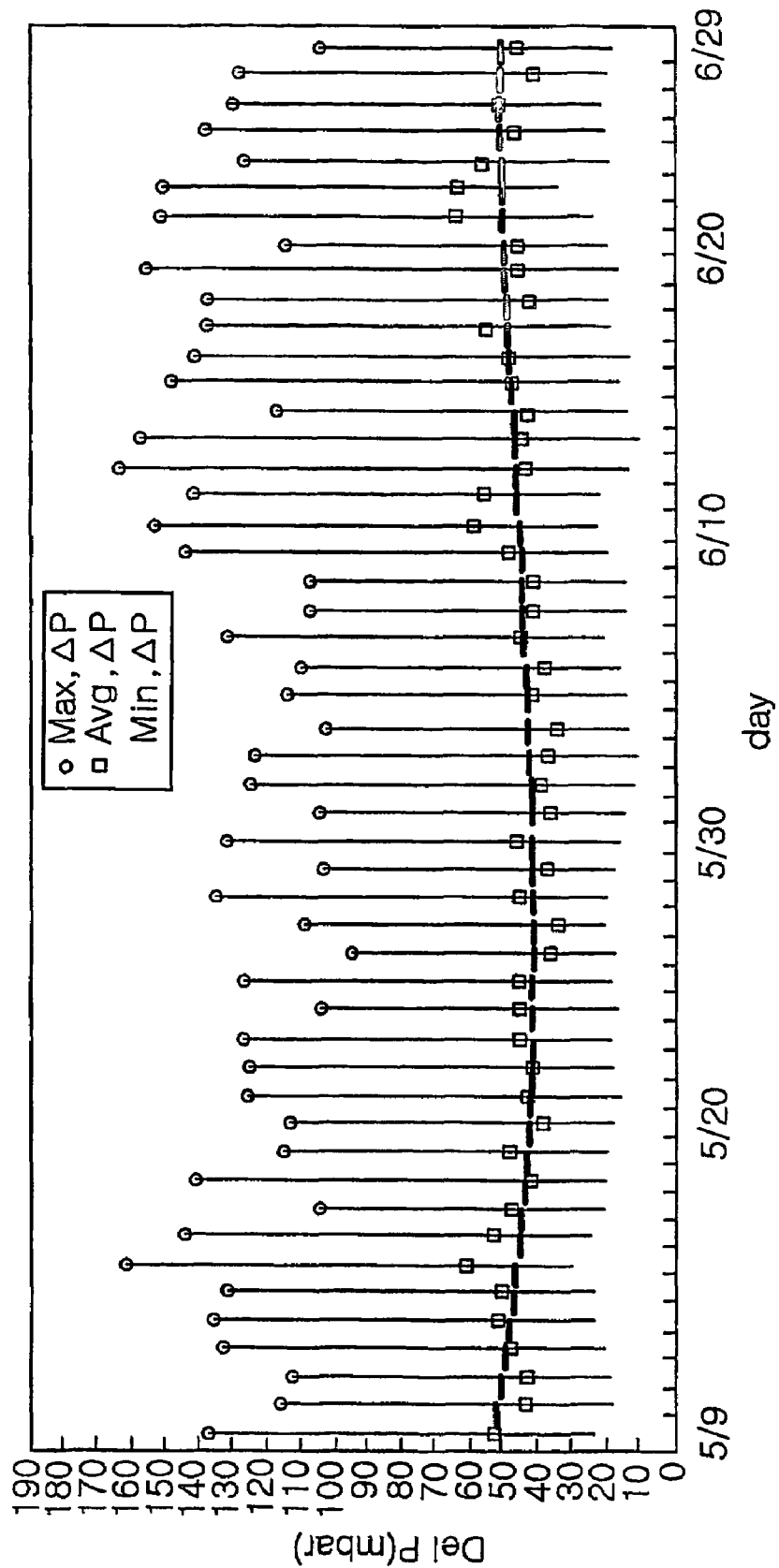
FIG. 3 is a graph showing the change of the pressure difference of the catalytic filter of the present invention per day.

As is illustrated in FIG. 3, it was confirmed that the collected amount of soot particulates in the catalytic filter was maintained at a constant level during the test period. This means that the soot particulates collected on the filter are removed periodically by combustion. Thereby, conventional problems, such as excessively high exhaust gas pressure drop in the filter that would negatively affect the engine operation, can be avoided.

INDUSTRIAL APPLICABILITY

As described above, the present invention provides a catalytic filter for removal of soot particulates from diesel engine exhaust and a preparation method thereof. When the catalytic filter of the present invention is applied to diesel vehicles, the soot particulates collected on the filter can be continuously removed, also abating gaseous pollutants (CO, HC and $NO_x$) from the diesel engine exhaust.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A catalytic filter for removal of soot particulates from diesel engine exhaust, comprising:

an oxidation catalyst positioned upstream of the catalytic filter, prepared by treating a PGM (platinum group metal) salt and a metal salt comprising a transition/alkali metal salt, Ba salt, or Mg salt with a water-soluble polymer compound and a reducing agent, to obtain a first colloidal mixture solution, which is then washcoated to a catalyst-support-coated monolithic ceramic substrate; and a catalyzed wall-flow filter positioned downstream of the catalytic filter, prepared by treating a PGM (platinum group metal) salt and a metal salt mixture including at least one catalyst metal selected from a first group consisting of Ba, Cr, Mn, Fe, Co, Ni, Cu, Mo, V and Pb to enhance oxidation activity and at least one catalyst metal selected from a second group consisting of Li, Na, K, Mg, Ca and Cs to decrease a combustion temperature of soot particulates, with a water-soluble polymer compound and a reducing agent, to obtain a second colloidal mixture solution, which is then washcoated on a catalyst-support-coated wall-flow filter.

2. The catalytic filter according to claim 1, wherein the metal salt mixture used for the catalyzed wall-flow filter further comprises at least one selected from a third group of catalyst metal to prevent oxidation of sulfur dioxide.

3. The catalytic filter according to claim 1, wherein the catalyst support comprises a substance selected from the group consisting of active alumina, silica, titania, and combinations thereof.

4. The catalytic filter according to claim 1, wherein the catalyst support contains 0.1-1.5 $g/in^3$ of $TiO_2$ and 0.1-1.5 $g/in^3$ of $SiO_2$, with a weight ratio of $TiO_2$ to $SiO_2$ of 2-4:1.

5. The catalytic filter according to claim 1, wherein the platinum group metal salt comprises Pt, Pd, Ru, Ir, Rh, or combinations thereof.

6. The catalytic filter according to claim 1, wherein the metal salt comprising a transition/alkali metal salt, Ba salt, or Mg salt comprises Ba, Ce, Co, Cr, Cs, Cu, Fe, K, Mg, Mn, Mo, Ni, Pb, V, W, or combinations thereof, and a weight ratio of the platinum group metal to the transition/alkali metal is in a range of 1:0.1-5.

7. The catalytic filter according to claim 1, wherein the oxidation catalyst contains 5-45 $g/ft^3$ of platinum group metal.

8. The catalytic filter according to claim 1, wherein the catalyzed wall-flow filter contains 5-45 $g/ft^3$ of the platinum group metal, 10-120 $g/ft^3$ of the first group of catalyst metal, and 5-40 $g/ft^3$ of the second group of catalyst metal.

9. The catalytic filter according to claim 2, wherein the third group of catalyst metal is selected from V, W and Mo.

10. The catalytic filter according to claim 2, wherein the catalyzed filter contains 5-45 g/ft$^3$ of the platinum group metal, 10-120 g/ft$^3$ of the first group of catalyst metal, 5-40 g/ft$^3$ of the second group of catalyst metal, and 10-150 g/ft$^3$ of the third group of catalyst metal.

11. The catalytic filter according to claim 1, wherein the catalyst-support-coated monolithic ceramic substrate comprises a flow-through ceramic honeycomb monolith, and the catalyst-support-coated wall-flow filter comprises a wall-flow ceramic honeycomb filter, ceramic foam, ceramic fiber filter, metal honeycomb, metal foam, or metal mesh.

12. A method of preparing a catalytic filter for removal of soot particulates from diesel engine exhaust, comprising:

treating a PGM (platinum group metal) salt and a metal salt comprising a transition/alkali metal salt, Ba salt, or Mg salt with a water-soluble polymer compound and a reducing agent, to obtain a first colloidal mixture solution, which is then washcoated to a catalyst-support-coated monolithic ceramic substrate, followed by calcination process at high temperatures, to obtain an oxidation catalyst; and treating a PGM (platinum group metal) salt and a metal salt mixture including at least one catalyst metal selected from a first group consisting of Ba, Cr, Mn, Fe, Co, Ni, Cu, Mo, V and Pb to increase oxidation activity for nitrogen oxide and at least one catalyst metal selected from a second group consisting of Li, Na, K, Mg, Ca and Cs to decrease a combustion temperature of soot particulates, with a water-soluble polymer compound and a reducing agent, to obtain a second colloidal solution, which is then washcoated on a catalyst-support-coated wall-flow filter, followed by calcination process at high temperatures, to obtain a catalyzed wall-flow filter.

13. The method according to claim 12, wherein the metal salt mixture used for the catalyzed wall-flow filter further comprises at least one selected from a third group of catalyst metal to prevent oxidation of sulfur dioxide.

14. The method according to claim 12, wherein the water-soluble polymer compound comprises polyvinylalcohol, polyvinylpyrrolidone, or polymethylacrylate.

15. The method according to claim 12, wherein the reducing agent comprises methanol, ethanol, hydrazine, or a mixture of methanol/sodium hydroxide.

16. The method according to claim 12, wherein the catalyst-support comprises a substance selected from the group consisting of active alumina, silica, titania, and combinations thereof.

17. The method according to claim 12, wherein the platinum group metal salt comprises Pt, Pd, Ru, Ir, Rh, or combinations thereof.

18. The method according to claim 12, wherein the metal salt comprising a transition/alkali metal salt, Ba salt, or Mg salt comprises Ba, Ce, Co, Cr, Cs, Cu, Fe, K, Mg, Mn, Mo, Ni, Pb, V, W, or combinations thereof, and a weight ratio of the PGM to the transition/alkali metal is in a range of 1:0.1-5.

19. The method according to claim 13, wherein the third group of catalyst metal is selected from among V, W and Mo.

20. The catalytic filter according to claim 2, wherein the catalyst support comprises a substance selected from the group consisting of active alumina, silica, titania, and combinations thereof.

21. The catalytic filter according to claim 2, wherein the catalyst support contains 0.1-1.5 g/in$^3$ of TiO$_2$ and 0.1-1.5 g/in$^3$ of SiO$_2$, with a weight ratio of TiO$_2$ to SiO$_2$ of 2-4:1.

22. The catalytic filter according to claim 2, wherein the platinum group metal salt comprises Pt, Pd, Ru, Ir, Rh, or combinations thereof.

23. The catalytic filter according to claim 2, wherein the metal salt comprising a transition/alkali metal salt, Ba salt, or Mg salt comprises Ba, Ce, Co, Cr, Cs, Cu, Fe, K, Mg, Mn, Mo, Ni, Pb, V, W, or combinations thereof, and a weight ratio of the platinum group metal to the transition/alkali metal is in a range of 1:0.1-5.

24. The catalytic filter according to claim 2, wherein the oxidation catalyst contains 5-45 g/ft$^3$ of platinum group metal.

25. The catalytic filter according to claim 9, wherein the catalyzed filter contains 5-45 g/ft$^3$ of the platinum group metal, 10-120 g/ft$^3$ of the first group of catalyst metal, 5-40 g/ft$^3$ of the second group of catalyst metal, and 10-150 g/ft$^3$ of the third group of catalyst metal.

26. The catalytic filter according to claim 2, wherein the catalyst-support-coated monolithic ceramic substrate comprises flow-through ceramic honeycomb monolith, and the catalyst-support-coated wall-flow filter comprises wall-flow ceramic honeycomb filter, ceramic foam, ceramic fiber filter, metal honeycomb, metal foam, or metal mesh.

27. The method according to claim 13, wherein the water-soluble polymer compound comprises polyvinylalcohol, polyvinylpyrrolidone, or polymethylacrylate.

28. The method according to claim 13, wherein the reducing agent comprises methanol, ethanol, hydrazine, or a mixture of methanol/sodium hydroxide.

29. The method according to claim 13, wherein the catalyst-support comprises active alumina, silica and/or titania.

30. The method according to claim 13, wherein the platinum group metal salt comprises Pt, Pd, Ru, Ir, Rh, or combinations thereof.

31. The method according to claim 13, wherein the metal salt comprising a transition/alkali metal salt, Ba salt, or Mg salt comprises Ba, Ce, Co, Cr, Cs, Cu, Fe, K, Mg, Mn, Mo, Ni, Pb, V, W, or combinations thereof, and a weight ratio of the PGM to the transition/alkali metal is in a range of 1:0.1-5.

* * * * *